(12) United States Patent  
Legrand

(10) Patent No.: US 6,374,585 B1
(45) Date of Patent: Apr. 23, 2002

(54) CUTTING HEAD FOR BRUSH CUTTERS OR EDGE TRIMMERS

(75) Inventor: Emmanuel Legrand, Villeneuve (FR)

(73) Assignee: Speed France (FR)

( * ) Notice: Subject to any disclaimer, the term of this patent is extended or adjusted under 35 U.S.C. 154(b) by 0 days.

(21) Appl. No.: 09/586,289

(22) Filed: Jun. 2, 2000

(30) Foreign Application Priority Data

Jun. 4, 1999 (FR) .............................................. 99 07228

(51) Int. Cl.[7] .............................................. A01D 34/62
(52) U.S. Cl. ...................................................... 56/12.7
(58) Field of Search ........................ 56/12.7, 255, 295, 56/294; 30/276, 397

(56) References Cited

U.S. PATENT DOCUMENTS

| | | | | |
|---|---|---|---|---|
| 4,268,964 A | * | 5/1981 | Moore | .......................... 30/276 |
| 4,513,563 A | | 4/1985 | Roser et al. | |
| 4,819,416 A | * | 4/1989 | Jones | .......................... 56/12.7 |
| 4,924,665 A | | 5/1990 | Crosley | |
| 4,936,884 A | * | 6/1990 | Campbell | .................... 56/12.7 |
| 5,197,264 A | * | 3/1993 | Lacey | .......................... 56/12.1 |
| 6,124,034 A | * | 9/2000 | Proulx et al. | ............ 56/12.7 X |

FOREIGN PATENT DOCUMENTS

| | | |
|---|---|---|
| DE | 2 444 610 A | 4/1975 |
| GB | 1 583 521 A | 1/1981 |
| GB | 2 214 048 A | 8/1989 |
| NL | 8 302 111 A | 1/1985 |

* cited by examiner

Primary Examiner—Robert E. Pezzuto
(74) Attorney, Agent, or Firm—Cantor Colburn LLP

(57) ABSTRACT

This rotary cutting head uses relatively short, individually retained, cutting line filaments. It includes, between its periphery and a central recess, at least one radial passageway of cross section corresponding to twice the cross section of a filament. Each filament passes through the corresponding passageway a first time and is folded through 180° in the recess, in order to pass through the passageway a second time, the 180° folding of the filament forming a lateral swelling which ensures its retention.

11 Claims, 2 Drawing Sheets

CUTTING HEAD FOR BRUSH CUTTERS OR EDGE TRIMMERS

TECHNICAL FIELD

The present invention relates to mechanized farming machines commonly called brush cutters and edge trimmers, intended for cutting vegetation by means of cutting lines. This invention relates more particularly to the rotary cutting heads for such machines.

These machines are generally equipped with an internal combustion engine or electric motor which rotates, at a high speed possibly of between approximately 3000 revolutions per minute and 12,000 revolutions per minute, a rotary head supporting one or more cutting lines. During rotation of the head, and owing to the effect of the centrifugal force, the cutting line or lines are deployed radially and thus sweep a certain circular region within which they exert a cutting effect on the vegetation encountered.

BACKGROUND OF THE INVENTION

At the present time, two broad categories of cutting heads are known for this kind of machine. The first type of head contains a reel of cutting line, which can be gradually paid out as the line used becomes worn or breaks. The second known type of head, to which the present invention also applies, does not use a reel of line but only one or more relatively short cutting line filaments which have to be fixed individually to the head. With regard to the latter type of cutting head, reference may be made to documents GB-A-2,214,048, NL-A-8,302,111, U.S. Pat. No. 4,924,665, GB-A-1,583,521 and U.S. Pat. No. 4,513,563.

All the current cutting heads, with or without a reel of cutting line, are difficult to reload, and/or have a complicated and expensive structure, and also pose various problems.

Thus, one drawback of cutting heads with a reel of line is the phenomenon of sticking, explained below: certain powerful machines apply considerable stress to the cutting line inside their rotary head, because of the vibrations and tensions in the line which are due to the rotation of said head at a very high speed, possibly up to 12,000 revolutions per minute. This results in a considerable rise in temperature, very close to the melting point of the usual cutting lines (from 200 to 220° C.), and this temperature rise may cause the turns of line wound on the reel housed in the rotary head to stick.

Another observed phenomenon is "eyelet breakage": a conventional cutting line, overly stressed, will end up breaking at the eyelet via which the line leaves the rotary head. This is because, as the result of repeated mechanical bending forces, the line heats up at the point where it leaves the eyelet of the head. The gradual rise in temperature of the line produces, at this point, a considerable swelling which rapidly becomes a point of weakness, which initiates line fracture; thereafter the line breaks. This phenomenon also results from the fact that the eyelets where the line leaves the current cutting heads are aluminum or brass eyelets with sharp corners, which promote line breakage.

In the case of known cutting heads without a reel, the mechanical members for retaining the cutting line filaments usually have a relatively complex structure and are not very easy to use, with the risk that, should the cutting line break, a piece of line remains jammed in said members and becomes difficult to extract.

More particularly, referring to the aforementioned documents, the prior art also includes the following features and drawbacks:

- documents GB-A-2,214,048 and NL-A-8,302,111: Each line filament must be folded into a "U" and introduced into two parallel passageways of small cross section in the head, something which appears to be difficult;
- document U.S. Pat. No. 4,924,665: The line filament is simply folded into a hook, at one end, and introduced through an opening, something which is applicable for a rigid metal wire but not applicable to a flexible line filament;
- document GB-A-1,583,521: According to FIGS. 4 and 6, the line filament passes "diametrally" through the cutting head, forming several sharp bends, something which makes it difficult to install and replace the line; according to FIGS. 5 and 7, each line filament has, at one end, an enlargement, thereby requiring the use of special cutting lines instead of lines of a standard type with a constant cross section;
- document U.S. Pat. No. 4,513,563: The line filament is retained by means of a knot formed in this filament (see FIG. 10), something which appears to be somewhat arbitrary: thus, a knot is difficult to form in a cutting line and the knot will have a tendency to come undone by itself over time.

Reference may also be made to document DE-A-2,444,610 (FIG. 2), which relates to a mower and not to a brush cutter or an edge trimmer, and in which the line filaments are made of metal and are retained by the fact that their two parallel portions are linked together, which means that said filaments are not easily removable and replaceable. Such a device is not suitable for the retention of flexible filaments forming two free cutting portions.

The present invention aims to eliminate the drawbacks of the current cutting heads with or without a reel, by providing an improved head which overcomes the problems of sticking and of eyelet breakage, while making it easier for the head to be reloaded with cutting line and for this line to be retained, by a particularly simple, inexpensive and effective solution.

SUMMARY OF THE INVENTION

For this purpose, the subject of the present invention is essentially a rotary cutting head for brush cutters or edge trimmers, of the kind of those using relatively short cutting line filaments individually retained on the head, this head being distinguished in that it includes, between its periphery and a central recess, at least one radial passageway of cross section corresponding to twice the cross section of a cutting line filament, in such a way that the or each cutting line filament passes through the radial passageway a first time and is folded through 180° inside the central recess in order to pass through said radial passageway a second time, the 180° folding of the filament forming, inside the central recess in the head, a lateral swelling of the filament which ensures its retention.

Thus, the invention provides a cutting head which, being of the "reel-less" type, already overcomes all the problems of sticking of the turns. In addition, this head includes a retention system for flexible cutting line filaments which requires no mechanical member, while ensuring very effective immobilization of the or each line filament, withstanding the centrifugal force (the tensile force needed to separate a line filament from the head being at least 2000 N).

In this regard, the invention relies on the surprising observation that a simple folding of a line filament made of synthetic material creates in this line, at the folding point, a lateral swelling sufficient to arrest the line because the passageway through which the line passes is suitably dimensioned. Such a swelling is obtained both with a cutting line filament of round cross section and with a line filament of polygonal, for example square, cross section. It has turned out that a line filament of generally square cross section, but with concave curvilinear sides, was conducive to the formation of the swelling retaining this line filament.

The handling needed for inserting a line filament and for folding it is simple and quick, and does not require any dismantling of the head, insofar as the central recess in the latter is directed downward, and therefore toward the outside of the machine.

According to a first possibility, the 180° folding of the or each cutting line filament, ensuring its retention on the head by creating a swelling, may be carried out a short distance from one end of this filament, the folded part being long enough to pass through the radial passageway made in the head.

According to another possibility, the 180° folding of the or each cutting line filament, ensuring its retention on the head by creating a swelling, is carried out approximately in the middle of the length of this filament, so as to form, from this filament, two free cutting line portions, which are parallel and approximately of the same length, extending in the same plane perpendicular to the axis of the head. Thus, a single line filament, immobilized in the head, forms two parallel active portions, thereby increasing the cutting power of the line while better distributing the force, hence increasing the longevity of the line. In addition, it has been observed that mounting two line portions "in parallel", in the same plane, resulted in an appreciable reduction in the sound level during operation, even when using a smooth line of ordinary (round or square) cross section.

According to another advantageous characteristic, the or each radial passageway, made in the cutting head, has at its outlet on the periphery of said head at least one rounded adjoining surface of relatively large radius of curvature, and also of relatively large developed length. This rounded shape, providing a large bearing surface for the cutting line filament leaving the head while limiting its bending, effectively and economically prevents the undesirable phenomenon of "eyelet breakage", and thus contributes to the longevity of the line. Preferably, the or each radial passageway has two such rounded bearing surfaces, arranged symmetrically, giving this passageway an outlet of flared shape, so as to provide the same advantageous effect, for a head rotating in one direction or the other.

Finally, it will be noted that the head, forming the subject-matter of the invention, can be made of both metal and of synthetic material, without dimensional limitations in terms of diameter or of height, this head possibly housing any number of cutting line filaments and being able to be used on any machine of the brush-cutter or edge-trimmer type, possibly with the insertion of an adapter for mounting it.

BRIEF DESCRIPTION OF THE DRAWINGS

The invention will be more clearly understood with the aid of the description which follows, with reference to the appended schematic drawing showing, by way of example, one embodiment of this cutting head for brush cutters or edge trimmers.

DETAILED DESCRIPTION OF THE PREFERRED EMBODIMENT

Figure 1:
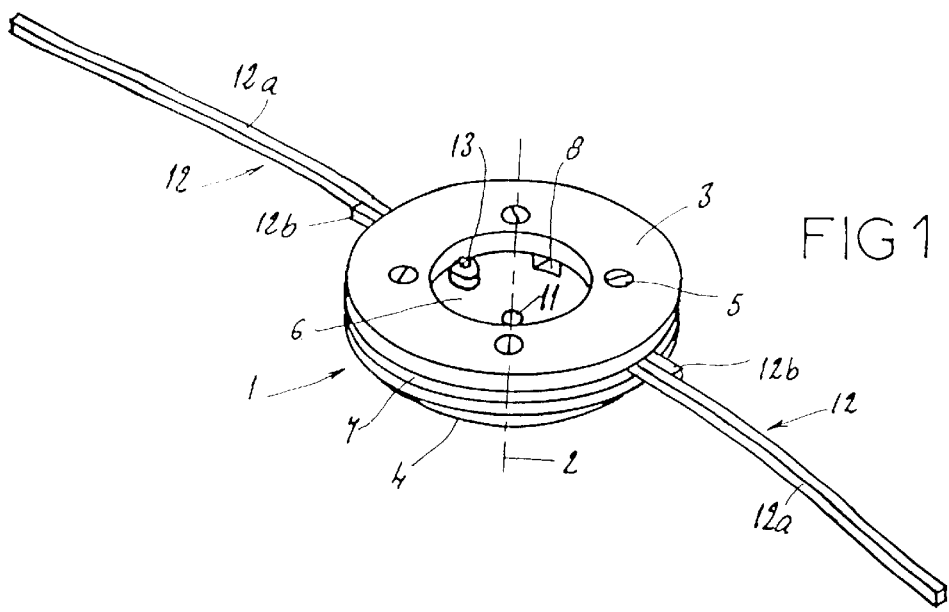
FIG. 1 is a perspective of a cutting head according to the present invention.

A rotary cutting head shown in FIG. 1, denoted overall by the reference 1, has a central axis 2 and results from the juxtaposition of circular pieces 3 and 4 joined together by means of several screws 5. The first piece 3 is of annular shape and the second piece 4 is of domed circular shape, so as to create, in the head 1, a central recess in the form of an approximately hemispherical cavity. The shape of the pieces 3 and 4 joined together defines a peripheral annular groove 7.

Figure 4:
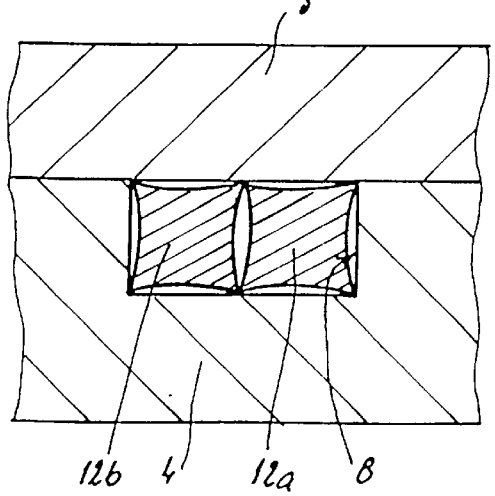
FIG. 4 is another partial sectional view of the same head, on IV—IV in FIG. 2, on an enlarged scale.
Figure 5:
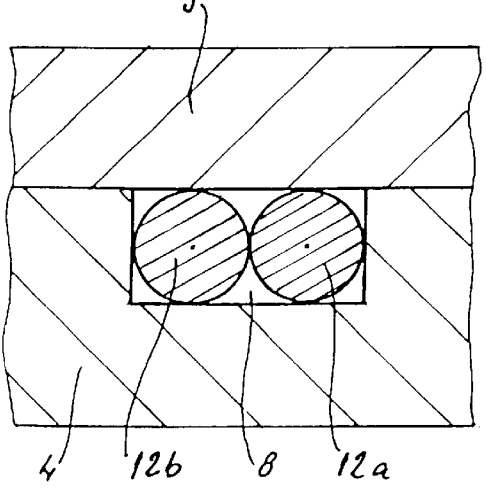
FIG. 5 is a sectional view similar to FIG. 4, illustrating an alternative embodiment relating to the cross section of the cutting line filaments.

Provided between the central recess 6 and the peripheral groove 7 in the head 1 are, in the example illustrated in the drawing, four radial passageways 8 shown in FIGS. 4 and 5, each radial passageway 8 has spaced apart by regular angular intervals of 90°. As a rectangular cross section, with a length equal to twice its height.

Figure 2:
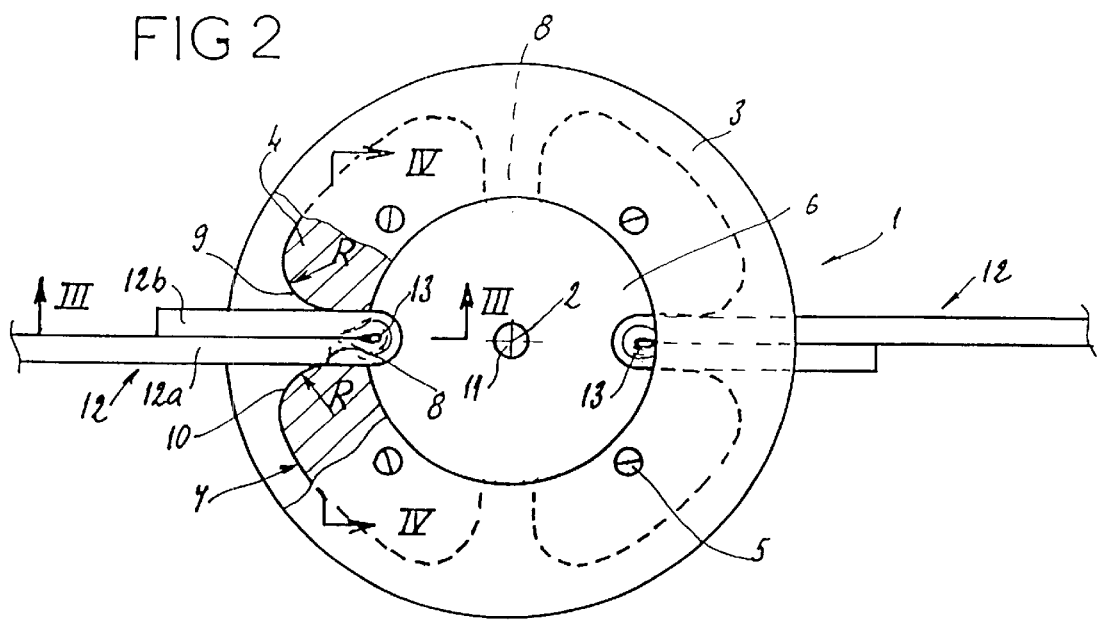
FIG. 2 is a plan view from below, in partial section, of the cutting head of FIG. 1.

As shown in FIG. 2, each radial passageway 8 has, at its outlet into the peripheral groove 7 in the head 1, a flaring resulting from two rounded adjoining surfaces 9 and 10 arranged symmetrically. The radius of curvature R and the developed length of each rounded surface 9 or 10 are relatively large, for example about 1 to 2 cm. The cutting head 1 also has a tapped hole 11 located on its central axis 2, at the bottom of the central recess 6, in order for it to be fastened to a machine such as a brush cutter or edge trimmer and for it to be driven in rotation by the drive means of this machine.

Figure 6:
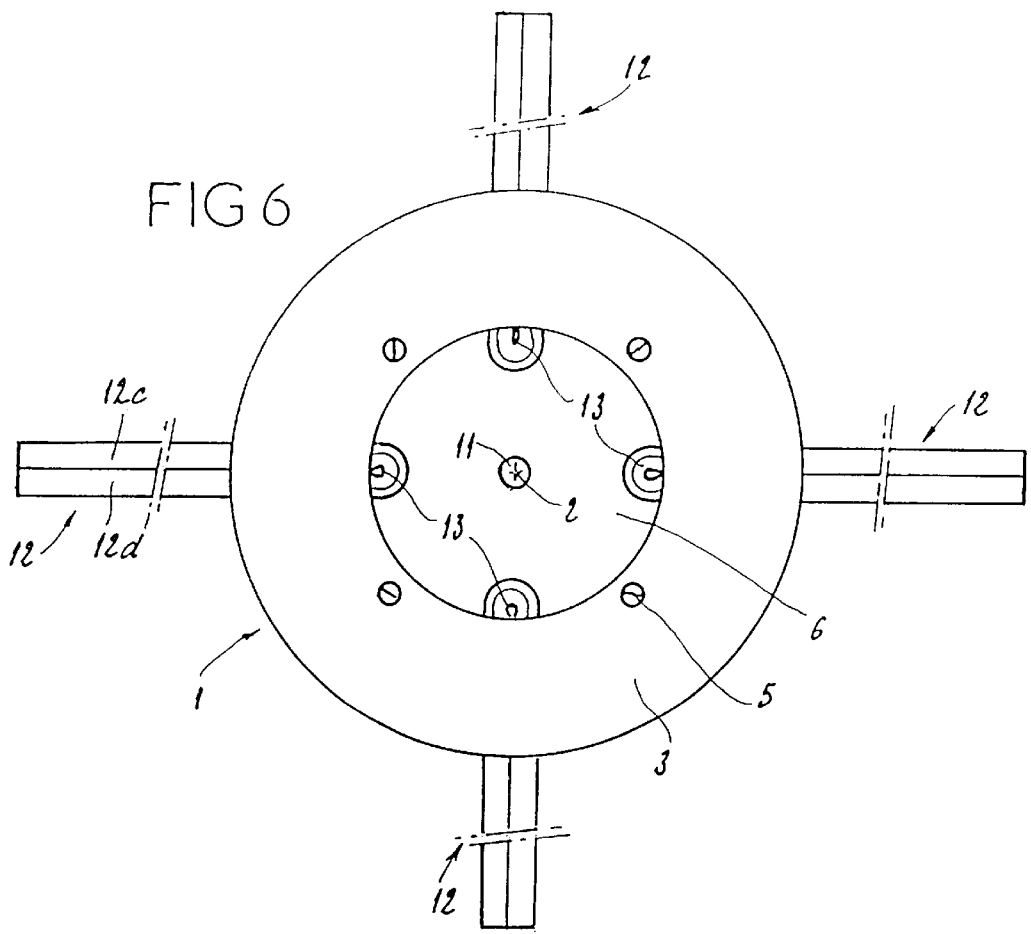
FIG. 6 is a plan view from below of the same cutting head, used with filaments differing in number and arrangement.

Each radial passageway 8 in the head 1 may house a cutting line filament 12, especially made of synthetic material, FIG. 1 showing the head 1 provided only with two diametrally opposed filaments 12 and FIG. 6 illustrating the possibility of providing this head 1 with four filaments 12 separated by angular intervals of 90°.

Each cutting line filament 12 is fastened to the head 1 by passing through a passageway 8 a first time, from the outside toward the inside, and then being folded through 180° inside the central recess 6 and finally by passing through the same radial passageway 8 a second time, from the inside toward the outside. At the point of 180° folding of the filament 12, this folding forms a lateral swelling 13 of the filament 12, which ensures its retention by butting against the surface of the central recess 6, around the internal outlet of the passageway 8, as shown in FIG. 3.

Figure 3:
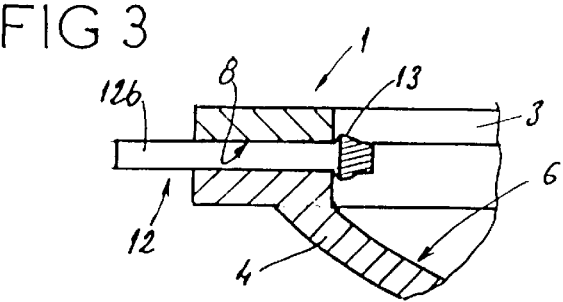
FIG. 3 is a partial sectional view of this head on III—III in FIG. 2.

In the example illustrated in FIGS. 1 to 3, the 180° folding of each cutting line filament 12 is carried out a short distance from one end of this filament 12. Thus, the filament 12 has a long main part 12a serving for cutting vegetation, and a short folded part 12b sufficient for passing through the corresponding radial passageway 8.

Upon passing through this radial passageway 8, the two parts 12a and 12b of the filament 12 are juxtaposed and fill the cross section of the passageway 8, as shown in FIG. 4. Advantageously, the filament 12 has an approximately square cross section, the side of which corresponds to the height of the cross section of the radial passageway 8, and therefore to half the length of this cross section. More particularly, by using a cutting line filament 12 of square cross section with concave curvilinear sides, the formation of the lateral swelling 13 ensuring retention of this filament 12 is favored.

In an alternative embodiment, as shown in FIG. 5, each cutting line filament 12 may also have a circular cross section, the diameter of which corresponds to the height of the cross section of the radial passageway 8, and therefore to half the length of the cross section of this passageway 8.

Finally, referring to FIG. 6, it will be noted that each cutting line filament 12 may also be folded through 180° half way along its length, so as to form two free cutting portions 12c and 12d of the same length, which extend parallel to each other, in the same plane perpendicular to the central axis 2 of the cutting head 1. Such a doubling of the filaments 12 ensures particularly silent operation of the cutting head 1, while improving the cutting power.

In all cases, during operation, one or other of the rounded surfaces 9 and 10 (depending on the direction of rotation of the head 1) serves as a bearing surface for the corresponding filament 12, at the point where it leaves the head 1, thereby preventing the phenomenon of "eyelet breakage".

It would not be outside the scope of the invention, as defined in the appended claims:

- to modify the number of radial passageways made in the cutting head or to modify other shape details of this head;
- to produce the cutting head from any material, and as one or more pieces;
- to modify the number of cutting line filaments fastened to the head;
- to use cutting line filaments of any cross section and of any material allowing them to be folded with the formation of a swelling.

What is claimed is:

1. A rotary cutting assembly for brush cutters or edge trimmers comprising:
    a filament having a first end and a filament cross-section;
    a head having a periphery and a central recess, said head including at least one radial passageway disposed between said periphery and said central recess, said radial passageway having a radial cross-section that is twice said filament cross-section;
    wherein said first end of said filament passes through said radial passageway a first time, said filament is folded forming a folded section, said first end of said filament passes through said radial passageway a second time, said folded section is disposed at said central recess, said folded section having a lateral swelling.

2. The assembly of claim 1, wherein said filament cross-section has a round shape.

3. The assembly of claim 1, wherein said filament cross-section has a polygonal shape.

4. The assembly of claim 3, wherein said polygonal shape includes a square cross-section, said square cross-section having concave curvilinear sides.

5. The assembly of claim 1, wherein said first end of said filament is disposed approximately at said periphery after being passed through said radial passageway said second time.

6. The assembly of claim 1, wherein said folded section occurs at approximately a mid-point of said filament.

7. The assembly of claim 1, wherein said filament extends in a plane perpendicular to an axis of said head.

8. The assembly of claim 1, wherein said radial passageway includes a rounded surface at said periphery.

9. The assembly of claim 8, wherein said rounded surface includes two rounded surfaces arranged symmetrically so that said radial passageway has a flared shape at said periphery.

10. The assembly of claim 1, wherein said filament passed through said radial passageway said first time causes a first part filament disposed in said radial passageway and said filament passed through said radial passageway said second time causes a second part filament disposed in said radial passageway, said first part filament is juxtaposed with said second part filament in said radial passageway.

11. The assembly of claim 1, wherein said first part filament and said second part filament fill said radial cross-section.

\* \* \* \* \*

UNITED STATES PATENT AND TRADEMARK OFFICE
CERTIFICATE OF CORRECTION

PATENT NO. : 6,374,585 B1
DATED : April 23, 2002
INVENTOR(S) : Emmanuel Legrand

It is certified that error appears in the above-identified patent and that said Letters Patent is hereby corrected as shown below:

Column 4,
Line 21, delete "Provided between the central recess 6 and the peripheral groove 7 in the head 1 are, in the example illustrated in the drawing, four radial passageways 8 shown in FIGS 4 and 5, each radial passageway 8 has spaced apart by regular angular intervals of 90°. As a rectangular cross section, with a length equal to twice its height." and insert therefor -- Provided between the central recess 6 and the peripheral groove 7 in the head 1 are, in the example illustrated in the drawing, four radial passageways 8 spaced apart by regular angular intervals of 90°. As shown in Figures 4 and 5, each radial passageway 8 has a rectangular cross section, with a length equal to twice its height. --.

Signed and Sealed this

Twenty-seventh Day of September, 2005

JON W. DUDAS
*Director of the United States Patent and Trademark Office*